UNITED STATES PATENT OFFICE.

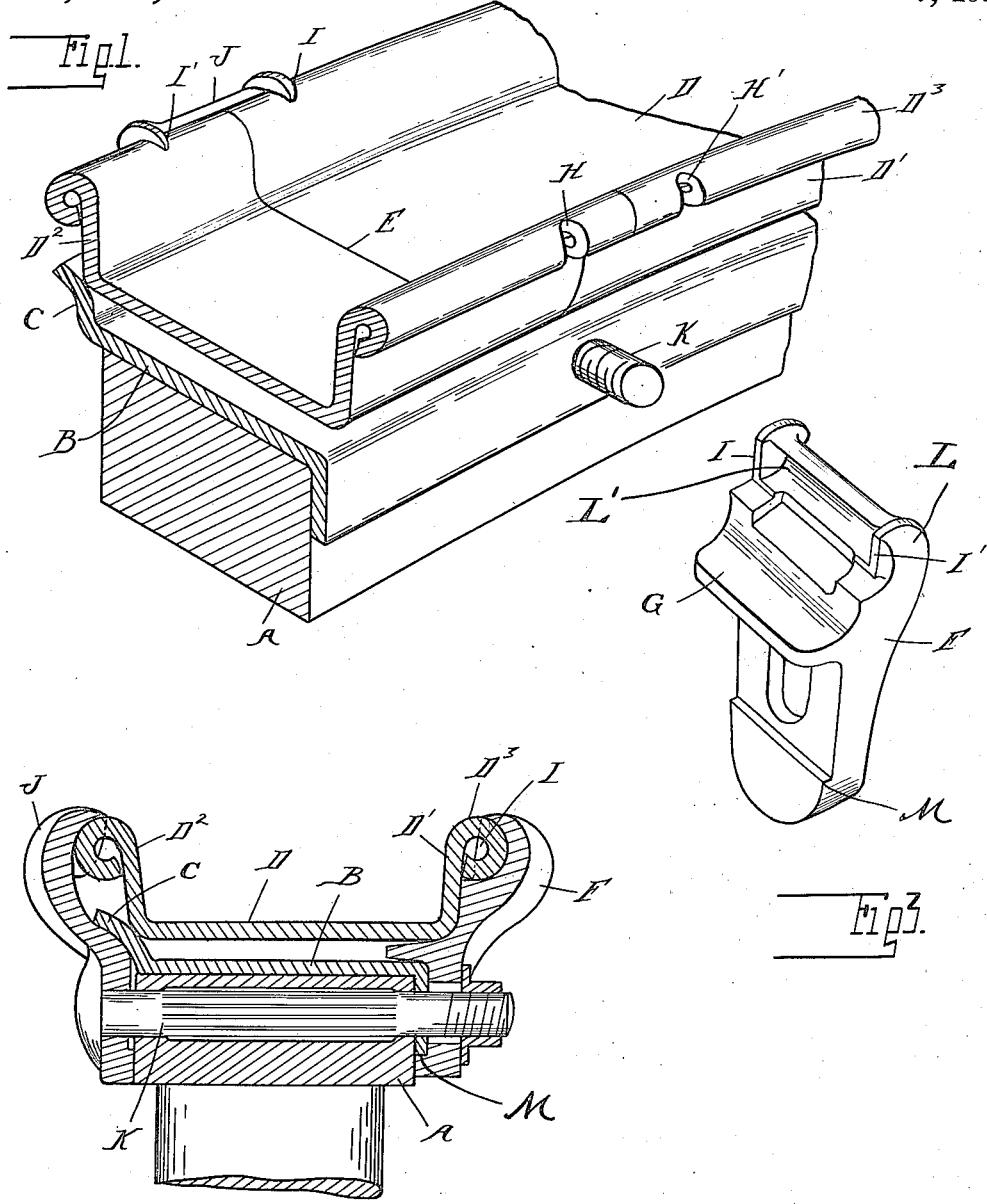
W. N. BOOTH.
VEHICLE WHEEL RIM.
APPLICATION FILED JULY 29, 1916.
1,405,481. Patented Feb. 7, 1922.
Inventor
William N. Booth
By Whittemore Hulbert & Whittemore
Attorneys

WILLIAM N. BOOTH, OF DETROIT, MICHIGAN, ASSIGNOR TO KELSEY WHEEL COMPANY, INC., OF DETROIT, MICHIGAN, A CORPORATION OF NEW YORK.

VEHICLE WHEEL RIM.

1,405,481.   Specification of Letters Patent.   Patented Feb. 7, 1922.

Application filed July 29, 1916. Serial No. 112,058.

*To all whom it may concern:*

Be it known that I, WILLIAM N. BOOTH, a citizen of the United States of America, residing at Detroit, in the county of Wayne and State of Michigan, have invented certain new and useful Improvements in Vehicle Wheel Rims, of which the following is a specification, reference being had therein to the accompanying drawings.

The invention relates to vehicle wheel rims of the demountable type, in which the rim is transversely split to permit collapsing for engagement of the tire. It is the object of the invention to provide means for locking the abutting end portions of the split rim so as to prevent separation of the same, and to this end the invention comprises the construction as hereinafter set forth.

In the drawings:

Figure 1 is a perspective view of a portion of a vehicle wheel and demountable rim;

Figure 2 is a cross section thereof; and

Figure 3 is a perspective view of the clamping plate.

A is the felly of the wheel and B the felly rim having a flaring flange C on its inner edge forming a seat for the demountable rim D, which is transversely split at E. F are clamping lugs for engaging the outer edge of the demountable rim and holding the same to its seat.

It is usual to provide the lugs F with wedge portions G which enter the space between the felly band B and demountable rim D, and during the tightening of the clamps wedge said demountable rim outward. This wedging action causes a tension upon the demountable rim, tending to separate the end portions thereof upon opposite sides of the split, and to prevent such a result I have provided the following construction:

The rim D is provided on its opposite sides with tire-retaining flanges D' and D² which preferably terminate in beads D³ formed by returnbending the metal. In these beads and upon opposite sides of the split E in the rim are formed recesses H and H' adapted to be engaged by projections I and I' on a connecting tie member. This tie member I preferably form as an integral part of one of the clamping lugs, which lug is positioned to embrace the split in the rim. The locking device just described is applied to the outer edge of the tire rim, but it may also be advantageously applied to the inner edge thereof. In the latter case the tie member J is not a wedge, as the rim is seated upon the flange C, but the member J may be secured by the same clamping bolt which secures the wedge lug on the opposite side of the rim. Thus, as shown in Figure 2, the member J is fashioned to pass around and beneath the flange C and to engage the clamping bolt K adjacent to the head thereof, while the opposite end of said clamping bolt engages the wedge clamping bolt F. However, this construction is not essential, for it is obvious that a locking member may be applied to one edge of the demountable rim, other means being provided for locking the opposite edge.

As shown, the connecting tie member L is provided with the groove L' for engaging the bead D³, and the clamping lug of which the tie member is an integral part, is provided with the inwardly extending projection M engaging the lower edge of the flange of the felly band B extending radially inward at the side of the felly A. The clamping lug also having the wedge portion G, the lug is securely held from radial movement either outwardly or inwardly relative to the felly so that the member L with its groove maintains the demountable rim D in accurate radial position. The projections I and I' closing the ends of the groove in tie member reinforce the latter.

From the above description it is seen that the clamping lug of which the tie member is an integral part positions the rim both radially and peripherally and the projections upon the tie member maintain the ends of the split rim adjacent to each other and reinforce the tie member.

What I claim as my invention is:

1. The combination with a transversely-split demountable rim provided with a tire-retaining flange at one side thereof, said flange having a beaded outer edge, of a felly-band, a tie-plate clamped to said felly-band, arranged to embrace the split and to extend adjacent to said tire-retaining flange of the rim, said beaded outer edge of the rim and said tie-plate having cooperating wedging recesses and projections, and a bearing for said rim at the side of said felly-band opposite said tire-retaining flange.

2. The combination with a transversely-split demountable rim having tire-retaining flanges upon opposite sides thereof, said flanges having wedge-shaped notches therein near the split, of a felly-band providing a seat for the inner side of said rim, a wedge clamping plate for engaging the outer side of said rim to hold the same upon its seat, said plate embracing the split in the rim and having projections for engaging said wedge-shaped recesses in the outer tire-retaining flange, a tie-plate embracing the split in the rim and having projections for engaging said wedge-shaped recesses in the inner tire-retaining flange, and a clamping bolt passing through the felly-band for engaging said tie-plate and wedge clamping plate to retain the same in engagement with the rim.

3. The combination with a wheel felly and a transversely-split demountable rim, of clamping plates provided with means for accurately spacing said rim relative to said felly, one of said plates provided with second means for holding the ends of said rim adjacent to each other.

4. The combination with a wheel felly and a transversely-split demountable rim having a tire-retaining flange at one side thereof, said flange having a beaded outer edge with notches therein adjacent to the split, of clamping plates provided with grooves for engaging said beaded edge, one of said clamping plates provided with projections for engaging the notches in said edge, and means providing a bearing for said rim at the side opposite said tire-retaining flange.

5. The combination with a wheel felly and a transversely-split demountable rim having a tire-retaining flange at one side thereof, said flange having a beaded outer edge with notches therein adjacent to the split, of a clamping plate provided with a groove for engaging said beaded edge and with projections closing said groove and engaging the notches in said beaded edge, and a bearing for said rim at the side opposite said tire-retaining flange.

6. The combination of a transversely-split demountable rim having a tire-retaining flange at one side thereof, said flange having a notched beaded outer edge, the notches being on opposite sides of the split and adjacent thereto, for the purpose described.

7. The combination of a clamping plate having a grooved portion on its inner or rim-engaging face and projections closing said groove, for the purpose described.

8. The combination of a transversely-split demountable rim having a bearing for a rim at one side and a tire-retaining flange at the opposite side thereof, said flange having a beaded outer edge provided with wedge-shaped notches therein on opposite sides of the split and adjacent thereto, for the purpose described.

9. The combination of a clamping plate having a grooved portion on its inner face near the outer end and wedge-shaped projections closing the groove, for the purpose described.

In testimony whereof I affix my signature, in the presence of two witnesses.

WILLIAM N. BOOTH.

Witnesses:
James P. Barry,
Adelaide I. Adams.